United States Patent
Hendershot et al.

(10) Patent No.: US 8,573,965 B2
(45) Date of Patent: Nov. 5, 2013

(54) METHOD OF OPERATING A PYROLYSIS HEATER FOR REDUCED NOX

(75) Inventors: Reed Jacob Hendershot, Breinigsville, PA (US); Xianming Jimmy Li, Orefield, PA (US); Aleksandar Georgi Slavejkov, Allenton, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 1742 days.

(21) Appl. No.: 11/946,211

(22) Filed: Nov. 28, 2007

(65) Prior Publication Data
US 2009/0136880 A1   May 28, 2009

(51) Int. Cl.
*F23D 14/02*   (2006.01)

(52) U.S. Cl.
USPC .............................. 431/10; 431/12; 431/181

(58) Field of Classification Search
USPC ........................................ 431/10, 12, 181, 2
See application file for complete search history.

(56) References Cited

U.S. PATENT DOCUMENTS

| | | |
|---|---|---|
| 4,054,407 A | 10/1977 | Carrubba et al. |
| 4,454,839 A | 6/1984 | Gater et al. |
| 6,685,893 B2 | 2/2004 | Platvoet et al. |
| 7,025,590 B2 | 4/2006 | Bussman et al. |
| 7,153,129 B2 | 12/2006 | Bussman et al. |
| 7,172,412 B2 | 2/2007 | Platvoet et al. |
| 2005/0106518 A1 | 5/2005 | Platvoet et al. |
| 2005/0158684 A1 | 7/2005 | Bussman et al. |

FOREIGN PATENT DOCUMENTS

WO   02/085623 A1   10/2002

OTHER PUBLICATIONS

Sobiesiak, A., et al; "Performance Characteristics of the Novel Low-NOx CGRI Burner for Use with High Air Preheat"; Combustion and Flame, Elsevier Science Publishing Co., Inc.; New York, NY; vol. 115, No. 1-2; Oct. 1, 1998; pp. 93-125; XP004281986.
Lieuwen, et al; "The Role of Equivalence Ratio Oscillations in Driving Combustion Instabilities in Low NOx Gas Turbines"; vol. 27, No. 2; Jan. 1, 1998; pp. 1809-1816; XP022034621.
Gomaa, et al., NOx/CO Emissions and Control in Ethylene Plants, Environmental Progress, vol. 10, No. 4, pp. 267-272, Nov. 1991.
Burners for Fired Heaters in General Refinery Services, API Recommended Practice 535, Second Edition, Jan. 2006, American Petroleum Institute, pp. 1-76.

*Primary Examiner* — Alfred Basichas
(74) *Attorney, Agent, or Firm* — Bryan C. Hoke, Jr.

(57) ABSTRACT

A method of operating a pyrolysis heater for reduced emissions of NOx and carbon monoxide. One or more wall burners, typically premix burners, are operated with more excess oxidant gas than one or more of the floor or hearth burners, which are typically non-premix burners. The invention takes advantage of different NOx emissions characteristics from different types of burners.

9 Claims, 2 Drawing Sheets

METHOD OF OPERATING A PYROLYSIS HEATER FOR REDUCED NOX

BACKGROUND

The present invention relates to a heater for the pyrolysis of hydrocarbons and particularly to a method of operating a pyrolysis heater with reduced NOx emissions.

A pyrolysis heater may also be referred to as a pyrolysis furnace. A pyrolysis heater is any device for the pyrolysis or steam cracking of hydrocarbons.

The steam cracking or pyrolysis of hydrocarbons for the production of olefins is almost exclusively carried out in tubular coils placed in fired heaters. The pyrolysis process is considered to be the heart of an olefin plant and has significant influence on the economics of the overall plant.

The hydrocarbon feedstock may be any one of the wide variety of typical cracking feedstocks such as methane, ethane, propane, butane, mixtures of these gases, natural gas, naphthas, gas oils, etc. The product stream contains a variety of components, the concentration of which are dependent in part upon the feed selected. In the conventional pyrolysis process, vaporized feedstock is fed together with dilution steam to a tubular reactor located within the fired heater. The quantity of dilution steam required is dependent upon the feedstock selected; lighter feedstocks such as ethane require lower steam (0.2 lb./lb. feed), while heavier feedstocks such as naphtha and gas oils generally require steam/feed ratios of 0.5 to 1.0. The dilution steam has the dual function of lowering the partial pressure of the hydrocarbon and reducing the carbon laydown rate in the pyrolysis coils.

In a typical pyrolysis process, the steam/feed mixture is preheated to a temperature just below the onset of the cracking reaction, typically 650° C. This preheat occurs in the convection section of the heater. The mixture then passes to the radiant section where the pyrolysis reactions occur. Generally the residence time in the pyrolysis coil is in the range of 0.2 to 0.4 seconds and outlet temperatures for the reaction are on the order of 700° to 900° C. The reactions that result in the transformation of saturated hydrocarbons to olefins are highly endothermic thus requiring high levels of heat input. This heat input must occur at the elevated reaction temperatures. It is generally recognized in the industry that for most feedstocks, and especially for heavier feedstocks such as naphtha, shorter residence times will lead to higher selectivity to ethylene and propylene since secondary degradation reactions will be reduced. Further it is recognized that the lower the partial pressure of the hydrocarbon within the reaction environment, the higher the selectivity.

The flue gas temperatures in the radiant section of the fired heater are typically above 1,100° C. In a conventional design, approximately 32 to 40% of the heat fired as fuel into the heater is transferred into the coils in the radiant section. The balance of the heat is recovered in the convection section either as feed preheat or as steam generation. Given the limitation of small tube volume to achieve short residence times and the high temperatures of the process, heat transfer into the reaction tube is difficult. High heat fluxes are used and the operating tube metal temperatures are close to the mechanical limits for even exotic metallurgies. In most cases, tube metal temperatures limit the extent to which residence time can be reduced as a result of a combination of higher process temperatures required at the coil outlet and the reduced tube length (hence tube surface area) which results in higher flux and thus higher tube metal temperatures. The exotic metal reaction tubes located in the radiant section of the cracking heater represent a substantial portion of the cost of the heater so it is important that they be utilized fully. Utilization is defined as operating at as high and as uniform a heat flux and metal temperature as possible consistent with the design objectives of the heater. This will minimize the number and length of the tubes and the resulting total metal required for a given pyrolysis capacity.

In the majority of cracking furnaces, the heat is supplied by floor burners, also called hearth burners, that are installed in the floor of the firebox and fire vertically upward along the walls. Because of the characteristic flame shape from these burners, an uneven heat flux profile is created. The typical profile shows a peak flux near the center elevation of the firebox, with the top and bottom portions of the firebox remaining relatively cold. In select heaters, radiant wall burners are installed in the top part of the sidewalls to equalize the heat flux profile in the top portion of the heater. Improving the heat flux profile is complicated by NOx emission considerations.

Nitrogen oxides (NOx) are produced in essentially all combustion processes using air as the oxidant gas. NOx is produced primarily as nitric oxide (NO) in the hottest regions of the combustion zone. Some nitrogen dioxide ($NO_2$) is also formed, but its concentration is generally a small percentage of the total NOx.

Nitrogen oxides are among the primary air pollutants emitted from combustion processes. NOx emissions have been identified as contributing to the degradation of the environment, particularly degradation of air quality, formation of smog (poor visibility) and acid rain. As a result, air quality standards are being imposed by various governmental agencies, which limit the amount of NOx gases that may be emitted into the atmosphere.

In addition, there is an inverse relationship between NOx and CO formation which further complicates emissions control. Combustion processes do not perfectly bring together the three T's (time, temperature, and turbulence) to achieve complete combustion, and some amount of CO generation is inevitable. Generally speaking, the higher the peak combustion temperature, the lower the CO generation. Unfortunately, the trend is just the reverse for NOx generation; the higher the combustion temperature, the greater the NOx generation. Therefore, emission control for industrial combustion sources must compromise between NOx and CO control.

BRIEF SUMMARY

The present invention relates to a method of operating a pyrolysis heater.

The method comprises introducing a first fuel and a first oxidant gas into the pyrolysis heater through a first wall burner positioned in a row of wall burners, the first wall burner having a first equivalence ratio, $\phi_1$; and introducing at least one of the first fuel and a second fuel and at least one of the first oxidant gas and a second oxidant gas into the pyrolysis heater through a first floor burner positioned in a row of floor burners, the first floor burner having a second equivalence ratio, $\phi_2$; wherein $\phi_1 < \phi_2 \leq 1.0$.

The method may comprise one or more of the following characteristics, taken alone or in any possible technical combination.

The first equivalence ratio, $\phi_1$, may be less than 95% of the second equivalence ratio, $\phi_2$. The first equivalence ratio, $\phi_1$, may be less than 0.91 and the second equivalence ratio, $\phi_2$, may be greater than 0.91.

The first wall burner may be a premix burner.

The first floor burner may be a non-premix burner.

The method may further comprise introducing the first fuel and the first oxidant gas into the pyrolysis heater through a remaining set of wall burners positioned in the row of wall burners, each of the remaining set of wall burners having a respective wall burner equivalence ratio, wherein each respective wall burner equivalence ratio is within 2% of the first equivalence ratio; and introducing at least one of the first fuel and the second fuel and at least one of the first oxidant gas and the second oxidant gas into the pyrolysis heater through a remaining set of floor burners positioned in the row of floor burners, each of the remaining set of floor burners having a respective floor burner equivalence ratio, wherein each respective floor burner equivalence ratio is within 2% of the second equivalence ratio.

The remaining set of wall burners may be premix burners.

The remaining set of floor burners may be non-premix burners.

The method may further comprise introducing the first fuel and the first oxidant into the pyrolysis heater through a second wall burner positioned in the row of wall burners, the second wall burner having a third equivalence ratio, $\phi_3$, the second wall burner located adjacent to the first wall burner and spaced a first horizontal distance, $d_1$, from the first wall burner; and introducing at least one of the first fuel and the second fuel and at least one of the first oxidant gas and the second oxidant gas into the pyrolysis heater through a second floor burner positioned in the row of floor burners, the second floor burner having a fourth equivalence ratio, $\phi_4$, the second floor burner located adjacent to the first floor burner and spaced at a second horizontal distance, $d_2$, from the first floor burner, wherein $1.4 \times d_2 \leq d_1 \leq 2.1 \times d_2$.

The third equivalence ratio, $\phi_3$, may be less than the fourth equivalence ratio, $\phi_4$, and the fourth equivalence ratio, $\phi_4$, may be less than or equal to 1.

The third equivalence ratio, $\phi_3$, may be less than 95% of the fourth equivalence ratio, $\phi_4$.

The third equivalence ratio, $\phi_3$, may be less than 0.91 and the fourth equivalence ratio, $\phi_4$, may be greater than 0.91.

DETAILED DESCRIPTION

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

For the purposes of simplicity and clarity, detailed descriptions of well-known devices, circuits, and methods are omitted so as not to obscure the description of the present invention with unnecessary detail.

The present invention relates to a method of operating a pyrolysis heater for reduced NOx emissions. The method may be applied to a conventional pyrolysis heater having floor burners and wall burners.

Figure 1:
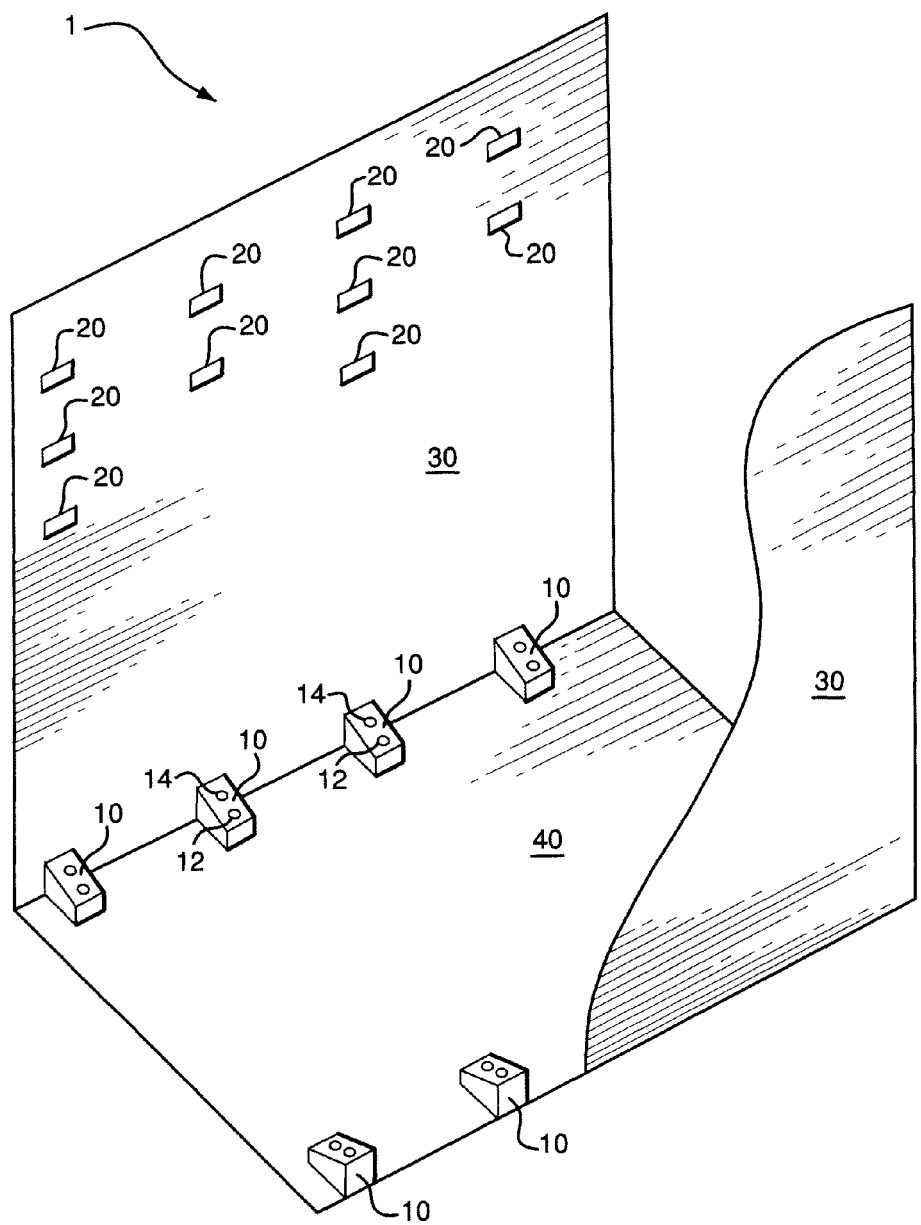
FIG. 1 is a perspective cutaway view of the lower portion of a part of a pyrolysis heater.

FIG. 1 illustrates a perspective cutaway view of a portion of the firebox 1 of a pyrolysis heater. The firebox 1 comprises walls 30 and a floor (also called a hearth) 40. Mounted on the floor 40 are vertically firing floor burners 10 which are directed upward along the walls and are supplied with oxidant gas and fuel. Floor burners 10 may be selected from any of the commercially available burners used in pyrolysis heaters. Floor burners 10 may be non-premix burners, meaning that fuel and oxidant gas are separately introduced into the pyrolysis heater. Floor burners 10 are shown having oxidant gas nozzle 12 and fuel nozzle 14 for separately introducing oxidant gas and fuel, respectively.

FIG. 1 also shows wall burners 20 mounted in or on the walls 30 of the pyrolysis heater. Wall burners 20 may be so-called premix burners, where fuel and oxidant gas are mixed together prior to being introduced into the burner or within the burner itself. Suitable wall burners for pyrolysis heaters are known in the art.

The method comprises introducing a first fuel and a first oxidant gas into the pyrolysis heater through a first wall burner 20. The first wall burner has a first equivalence ratio, $\phi_1$, meaning that the first fuel and the first oxidant gas are introduced with flow rates that provide the first equivalence ratio, $\phi_1$. The first wall burner 20 is positioned in a horizontal row of wall burners. FIG. 1 shows 3 rows of wall burners 20 on the wall.

The method comprises introducing at least one of the first fuel and a second fuel and at least one of the first oxidant gas and a second oxidant gas into the pyrolysis heater through a first floor burner 10. The first floor burner has a second equivalence ratio, $\phi_2$, meaning that the at least one of the first fuel and the second fuel and the at least one of the first oxidant gas and the second oxidant gas are introduced with flow rates that provide the second equivalence ratio, $\phi_2$. The first floor burner 10 is positioned in a row of floor burners. FIG. 1 shows 2 rows of floor burners on the floor. The floor burners 10 may use the same fuel (i.e. the first fuel) or a different fuel (i.e. the second fuel) than the wall burners 20. The floor burners 10 may use the same oxidant gas (i.e. the first oxidant gas) or a different oxidant gas (i.e. the second oxidant gas) than the wall burners 20. The at least one of the first fuel and the second fuel and the at least one of the first oxidant gas and the second oxidant gas may be introduced separately (i.e. non-premixed) into the pyrolysis heater through the first floor burner 10.

According to the method $\phi_1 < \phi_2 \leq 1.0$. The first equivalence ratio, $\phi_1$, is less than the second equivalence ratio, $\phi_2$, and the second equivalence ratio, $\phi_2$, is less than or equal to 1. The first equivalence ratio may be less than 95% of the second equivalence ratio. The first equivalence ratio may be less than 0.91 and the second equivalence ratio may be greater than 0.91. An equivalence ratio of 0.91 corresponds to 10% excess oxidant gas.

The "equivalence ratio" is a term used widely in combustion research. The equivalence ratio is defined as the fuel:oxidant gas ratio divided by the fuel:oxidant gas ratio corresponding to complete combustion. The latter ratio (fuel:oxidant gas ratio corresponding to complete combustion) is often referred to as the stoichiometric fuel:oxidant gas ratio. An equivalence ratio of 1 means that fuel and oxidant gas are provided in the theoretically correct or stoichiometric amount; an equivalence ratio of 1.0 is the same as 0% excess oxidant gas or "on-ratio". An equivalence ratio greater than 1 is fuel rich and an equivalence ratio less than 1 is fuel lean.

Since $\phi_1 < \phi_2 \leq 1.0$, it means that both the first wall burner and the first floor burner are operated in fuel lean mode, not substoichiometrically (i.e. not fuel rich). By maintaining fuel lean combustion for both the first wall burner and the first floor burner, CO emissions may be suppressed.

The first fuel and the second fuel may be selected from natural gas, refinery fuel gas or any other fuel known in the art for pyrolysis heaters.

The first oxidant gas and the second oxidant gas may be selected from air, oxygen-enriched air, oxygen-depleted air, industrial grade oxygen, or low-grade oxygen. The first oxidant gas may be at ambient temperature or may be preheated to a higher temperature. Air generally has an oxygen concentration of about 20.9 volume % oxygen, typically rounded off to 21 volume % oxygen. As used herein, oxygen-enriched air has an oxygen concentration greater than air up to and including 30 volume % oxygen; oxygen-depleted air has an oxygen concentration less than air down to 10 volume % oxygen (e.g. turbine exhaust); industrial grade oxygen has an oxygen concentration greater than 85 volume % up to 100 volume %; and low-grade oxygen has an oxygen concentration greater than 30 volume % up to and including 85 volume %.

The first wall burner may include fuel staging and/or oxidant gas staging. As defined herein, the equivalence ratio is calculated using the fuel flow rate and the oxidant gas flow rate for the primary burner nozzle(s) and any associated fuel staging lances and/or associated oxidant gas staging lances. A primary burner nozzle is any nozzle that provides a flame anchoring point wherein the ignition and continuous combustion of fuel with oxidant gas are assured. A fuel staging lance is associated with the closest primary burner nozzle. In case a fuel staging lance is positioned midway between the primary burner nozzles of two burners, half of the fuel is included with one of the burners and half to the other burner. Similarly, an oxidant staging lance is associated with the closest primary burner nozzle. In case an oxidant gas staging lance is positioned midway between the primary burner nozzles of two burners, half of the oxidant gas is included in the equivalence ratio calculation with one of the burners and half to the other burner.

The first floor burner may include fuel staging and/or oxidant gas staging. The equivalence ratio for the floor burner is calculated in the same way as described above for the first wall burner.

The first wall burner may be a premix burner. All of the wall burners may be premix burners. A premix burner is a burner where fuel and oxidant gas are mixed prior to entering the heater or furnace, and thereby imparts a functional characteristic to the process. The fuel and oxidant gas may be mixed prior to entering the burner or within the burner itself. As defined herein, a burner is a premix burner if at least 50% of the fuel flow to the burner and at least 50% of the oxidant gas flow to the burner is mixed prior to introducing the fuel and the oxidant gas into the pyrolysis heater through the burner. The balance of the fuel and/or oxidant gas may be introduced through associated fuel lances or associated oxidant gas lances.

The method may further comprise introducing the first fuel and the first oxidant gas through the first wall burner where the first wall burner is a premix burner. Alternatively stated, the method may further comprise mixing at least 50% of the first fuel flow to the first wall burner and at least 50% of the first oxidant gas flow to the first wall burner prior to introducing the first fuel and the first oxidant gas into the pyrolysis heater through the first wall burner 20. The first fuel and the first oxidant gas may be mixed prior to introducing into the burner or mixed within the burner itself.

The first floor burner 10 may be a non-premix burner. Non-premix burners are also referred to as diffusion flame-type burners. A non-premix burner is a burner where fuel and oxidant gas are introduced separately (i.e. through separate nozzles) into the heater or furnace without prior mixing, and thereby imparts a functional characteristic to the process. As defined herein, a non-premix burner is any burner that is not a premix burner.

The at least one of the first fuel and the second fuel and the at least one of the first oxidant gas and the second oxidant gas may be introduced into the pyrolysis heater through the first floor burner 10 separately, i.e. without mixing prior to introducing the fuel and oxidant into the pyrolysis heater.

Figure 2:
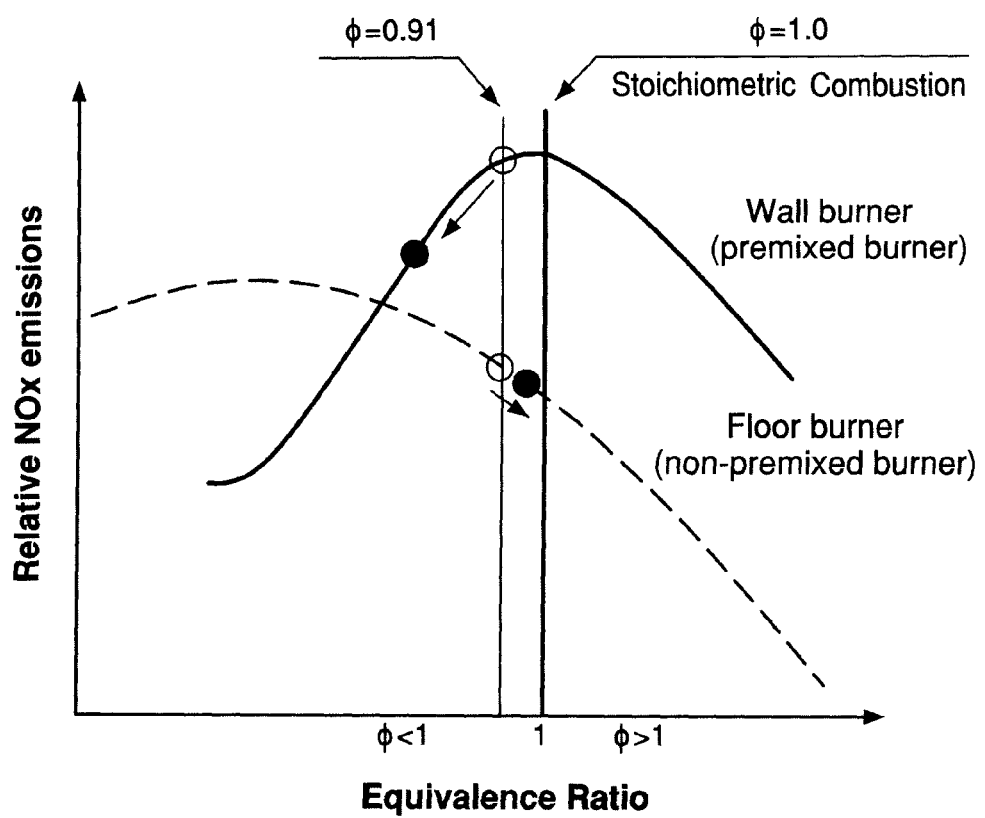
FIG. 2 shows generalized plots of NOx emissions as a function of equivalence ratio for a premix burner and a non-premix burner.

The effect of applying the method may be observed with the help of FIG. 2. FIG. 2 shows generalized plots of relative NOx emissions as a function of equivalence ratio for a premix burner and a non-premix burner. As shown in the plots, the NOx emissions from premixed burners and non-premixed burners vary depending on the equivalence ratio. Generally, premixed burners have a higher maximum NOx emissions than non-premixed burners, and the maximum occurs near an equivalence ratio of 1 for premix burners. The maximum NOx emissions for a non-premixed burner are generated at equivalence ratios less than 1 (fuel lean).

It is conventional to operate all of the burners in a pyrolysis heater at the same equivalence ratio, typically about 0.91, which corresponds to about 10% excess oxidant gas.

The inventors have discovered that overall pyrolysis heater NOx emissions may be reduced by operating the wall burners and the floor burners with different equivalence ratios, as per the method disclosed herein.

As illustrated in FIG. 2, the equivalence ratio for the floor burners (non-premixed) is increased closer to stoichiometric conditions, but not substoichiometric. At the same time, the equivalence ratio for the wall burners (premixed) is decreased. The overall equivalence ratio for the pyrolysis heater may still be about 0.91. Because the firing rate of the floor burners is higher than the firing rate for the wall burners, the relative change in the equivalence ratio for the wall burners is greater than for the floor burners. For example, for a pyrolysis heater having a row of floor burners along a wall and two rows of wall burners above, the percent firing rate to the floor burner may be about 80%, while the firing rate to the wall burners may be about 10% each. As depicted in FIG. 2, this has a synergistic effect for the reduction of NOx emissions.

As shown in FIG. 1, the wall burners 20 may have the same horizontal spacing or a different horizontal spacing than the floor burners 10. In FIG. 1, the lowest row of wall burners are shown to have a spacing 2 times the spacing of the floor burners. The wall burners are shown to align vertically with the floor burners. Alternatively, some or all of the wall burners may be staggered with respect to the floor burners.

The inventors have found that by increasing the spacing of at least the lowest row of wall burners, flame interaction can be decreased and thereby NOx emissions are also decreased. The lowest row refers to the height in the pyrolysis heater. The lowest row of wall burners may be spaced farther apart than the floor burners, preferably 1.4 to 2.1 times the spacing of the floor burners.

The method may further comprise introducing the first fuel and the first oxidant into the pyrolysis heater through a second wall burner 20, and introducing at least one of the first fuel and the second fuel and at least one of the first oxidant gas and the second oxidant gas into the pyrolysis heater through a second floor burner 10. The second wall burner 20 has a third equivalence ratio, $\phi_3$, meaning that the first fuel and the first oxidant gas are introduced through the second wall burner with flow rates that provide the third equivalence ratio, $\phi_3$. The second floor burner 10 has a fourth equivalence ratio, $\phi_4$, meaning that the at least one of the first fuel and the second fuel and the at least one of the first oxidant gas and the second oxidant gas are introduced through the second floor burner with flow rates that provide the fourth equivalence ratio, $\phi_4$. The second wall burner 20 is positioned in the horizontal row of wall burners. The second wall burner is located adjacent to the first wall burner and is spaced a first horizontal distance, $d_1$, from the first wall burner. The second floor burner is located adjacent to the first floor burner and is spaced at a second horizontal distance, $d_2$, from the first floor burner, where $1.4 \times d_2 \leq d_1 \leq 2.1 \times d_2$.

As defined herein, the burner located adjacent to the first wall burner is the adjacent burner having a non-zero firing rate. In case a burner has no fuel firing rate, it is ignored for the purpose of determining an adjacent burner.

According to this aspect of the method $\phi_3 < \phi_4 \leq 1.0$. The third equivalence ratio, $\phi_3$, is less than the fourth equivalence ratio, $\phi_4$, and the fourth equivalence ratio, $\phi_4$, is less than or equal to 1. The third equivalence ratio may be less than 95% of the fourth equivalence ratio. The third equivalence ratio may be less than 0.91 and the fourth equivalence ratio may be greater than 0.91.

All of the wall burners positioned in the row of wall burners may be operated with substantially the same equivalence ratio. Substantially the same equivalence ratio is defined herein to mean within 2% of the value of the equivalence ratio for any one of the burners in the row of wall burners. Consequently, the method may further comprise introducing the first fuel and the first oxidant gas into the pyrolysis heater through a remaining set of wall burners positioned in the row of wall burners, each of the remaining set of wall burners having a respective wall burner equivalence ratio, wherein each respective wall burner equivalence ratio is within 2% of the first equivalence ratio. The remaining set of wall burners positioned in the row of wall burners are the other wall burners in the row of wall burners, which when combined with the first wall burner make up the entire row of wall burners. Each of the wall burners has its respective equivalence ratio. The equivalence ratio of each of the wall burners is within 2% of the first equivalence ratio.

All of the floor burners positioned in the row of floor burners may be operated with substantially the same equivalence ratio. Substantially the same equivalence ratio has the same meaning as stated above for the wall burners, but applied instead to the floor burners. Consequently, the method may further comprise introducing at least one of the first fuel and the second fuel and at least one of the first oxidant gas and the second oxidant gas into the pyrolysis heater through a remaining set of floor burners positioned in the row of floor burners, each of the remaining set of floor burners having a respective floor burner equivalence ratio, wherein each respective floor burner equivalence ratio is within 2% of the second equivalence ratio. The remaining set of floor burners positioned in the row of floor burners are the other floor burners in the row of floor burners, which when combined with the first floor burner make up the entire row of floor burners. Each of the floor burners has its respective equivalence ratio. The equivalence ratio of each of the floor burners is within 2% of the second equivalence ratio.

EXAMPLE

The method was applied to a pyrolysis heater. Initially the pyrolysis heater operated with an equivalence ratio of about 0.91, representing the base case conditions. The oxygen concentration in the stack gases on a dry basis was about 2.7 volume %. Air to the floor burners was reduced, thereby providing a higher equivalence ratio and air to the wall burners was increased, thereby providing a lower equivalence ratio. The oxygen concentration in the stack gases on a dry basis was about 2.2 volume %. The NOx concentration in the stack gases was reduced about 17% when only a 6% reduction in NOx concentration would be expected based on a change in oxygen concentration in the stack alone.

We claim:

1. A method of operating a pyrolysis heater comprising:
   introducing a first fuel and a first oxidant gas into the pyrolysis heater through a first wall burner positioned in a row of wall burners, wherein the first wall burner is a premix burner, the first wall burner having a first equivalence ratio, $\phi_1$; and
   introducing at least one of the first fuel and a second fuel and at least one of the first oxidant gas and a second oxidant gas into the pyrolysis heater through a first floor burner positioned in a row of floor burners, wherein the first floor burner is a non-premix burner, the first floor burner having a second equivalence ratio, $\phi_2$;
   wherein $\phi_1 < 0.91 < \phi_2 \leq 1.0$. and $\phi_1 \leq 0.95 \times \phi_2$.

2. The method of claim 1 further comprising:
   introducing the first fuel and the first oxidant gas into the pyrolysis heater through a remaining set of wall burners positioned in the row of wall burners, each of the remaining set of wall burners having a respective wall burner equivalence ratio, wherein each respective wall burner equivalence ratio is within 2% of the first equivalence ratio; and
   introducing at least one of the first fuel and the second fuel and at least one of the first oxidant gas and the second oxidant gas into the pyrolysis heater through a remaining set of floor burners positioned in the row of floor burners, each of the remaining set of floor burners having a respective floor burner equivalence ratio, wherein each respective floor burner equivalence ratio is within 2% of the second equivalence ratio.

3. The method of claim 2 wherein the first wall burner and the remaining set of wall burners are premix burners.

4. The method of claim 2 wherein the first floor burner and the remaining set of floor burners are non-premix burners.

5. The method of claim 4 wherein the first wall burner and the remaining set of wall burners are premix burners.

6. The method of claim 1 further comprising:
   introducing the first fuel and the first oxidant into the pyrolysis heater through a second wall burner positioned in the row of wall burners, the second wall burner having a third equivalence ratio, $\phi_3$, the second wall burner located adjacent to the first wall burner and spaced a first horizontal distance, $d_1$, from the first wall burner; and
   introducing at least one of the first fuel and the second fuel and at least one of the first oxidant gas and the second oxidant gas into the pyrolysis heater through a second floor burner positioned in the row of floor burners, the second floor burner having a fourth equivalence ratio, $\phi_4$, the second floor burner located adjacent to the first floor burner and spaced at a second horizontal distance, $d_2$, from the first floor burner;
   wherein $1.4 \times d_2 \leq d_1 \leq 2.1 \times d_2$.

7. The method of claim 6 wherein $\phi_3 < \phi_4 \leq 1.0$.

8. The method of claim 7 wherein $\phi_3 < 0.95 \times \phi_4$.

9. The method of claim 6 wherein $\phi_3 < 0.91$ and $0.91 < \phi_4$.

* * * * *